United States Patent [19]

Anderson et al.

[11] 4,259,732
[45] Mar. 31, 1981

[54] TRANSDUCER ASSEMBLY FOR SELF-CALIBRATION

[75] Inventors: Phillip R. Anderson, Columbia; George R. Douglas, Arnold; John H. Thompson, Severna Park, all of Md.

[73] Assignee: Westinghouse Electric Corp., Pittsburgh, Pa.

[21] Appl. No.: 45,452

[22] Filed: Jun. 4, 1979

[51] Int. Cl.³ .......................................... H04R 29/00
[52] U.S. Cl. ..................................................... 367/13
[58] Field of Search ......................................... 367/13

[56] References Cited
U.S. PATENT DOCUMENTS 3,962,671  6/1976  Jilling ...................................... 367/13

*Primary Examiner*—Richard A. Farley
*Attorney, Agent, or Firm*—D. Schron

[57] ABSTRACT

An acoustic homing torpedo having an array of transducers wherein each transducer has a head mass, tail mass, and a main active element therebetween. An auxiliary active element is placed on the tail mass so that when given a predetermined signal it will cause the main element to provide a corresponding output signal so as to simulate the reception of an actual acoustic wave. By energizing the main element, the response of the auxiliary element may be examined for testing the transducer and the array in a transmit mode of operation.

10 Claims, 10 Drawing Figures

TRANSDUCER ASSEMBLY FOR SELF-CALIBRATION

BACKGROUND OF THE INVENTION

1. Field of the Invention

This invention in general relates to the testing of transducers, and more particularly is directed to a novel transducer structure to permit simplified testing and calibration.

2. Description of the Prior Art

Various methods exist for the testing of transducer arrays which for example may be found in homing torpedos. The array and its associated signal processing electronics must be tested to see that each individual transducer is operating properly within prescribed limits. Further, it is often desired to test the beam steering operation of the entire array of transducers.

Proper operation may be determined at the point of manufacture or at a large test facility by placing at least the transducer array portion of the torpedo into a large test tank and applying preprogrammed signals to the transducer array for testing in the transmit mode of operation. The receive mode of operation may be tested by placing acoustic sources in the tank and projecting acoustic energy to the array to simulate a target.

Another testing device involves the use of what is called an "inverse transducer" which is a transducer system that creates an equivalent acoustic plane wave front that is steerable. The inverse transducer is placed against the torpedo array face and then forced into intimate contact by the application of tons of force.

Both of the above test methods are adequate for initial testing at large facilities however it is also desired to check out the torpedo before launch, a process which includes the testing of the transducer array. Under such circumstances, and particularly where the torpedo is air-launched, space and weight may be at a premium and such testing methods are not possible or practical.

In an effort to save the weight of heavy testing equipment and with a view toward portability, a method has been proposed for testing the array wherein a special electrode is placed on the transducer active element to couple in preprogrammed test signals. A problem arises however in that the active element is supplied with signals at a relatively high voltage level which can cause arcing over to the leads going to the calibrating and testing circuitry. Further, in addition to the arc over problem, the special electrode picks off a portion of the applied signal and unless auxiliary protection circuitry is provided, the relatively high voltage picked off by the special electrode can completely burn out the calibration and test circuitry.

SUMMARY OF THE INVENTION

The transducer assembly of the present invention allows for a prelaunch check without the requirement for coupling to the transducer array with heavy external equipment and without the danger of damaging the equipment provided for prelaunch test.

The transducer assembly includes a head mass for projection and/or receipt of acoustic energy, a tail mass operative as an inertial element, and a first active transducer means interposed between, and coupled to, the head and tail masses. An auxiliary active transducer means is coupled to the tail mass and has a natural resonant frequency different from that of the coupled head mass, tail mass, and first active transducer means. The auxiliary active transducer means is positioned so that when either one of the active transducer means is selectively supplied with an energizing signal it will cause movement of the tail mass and a corresponding output signal from the other of the active transducer means. The first active transducer means is electrically connected to the transmit and receive circuitry carried by the torpedo and the auxiliary active transducer means may be connected to testing circuitry either external to the torpedo, internal to the torpedo, or combination of both, depending upon the particular design.

DESCRIPTION OF THE PREFERRED EMBODIMENT

Figure 1:
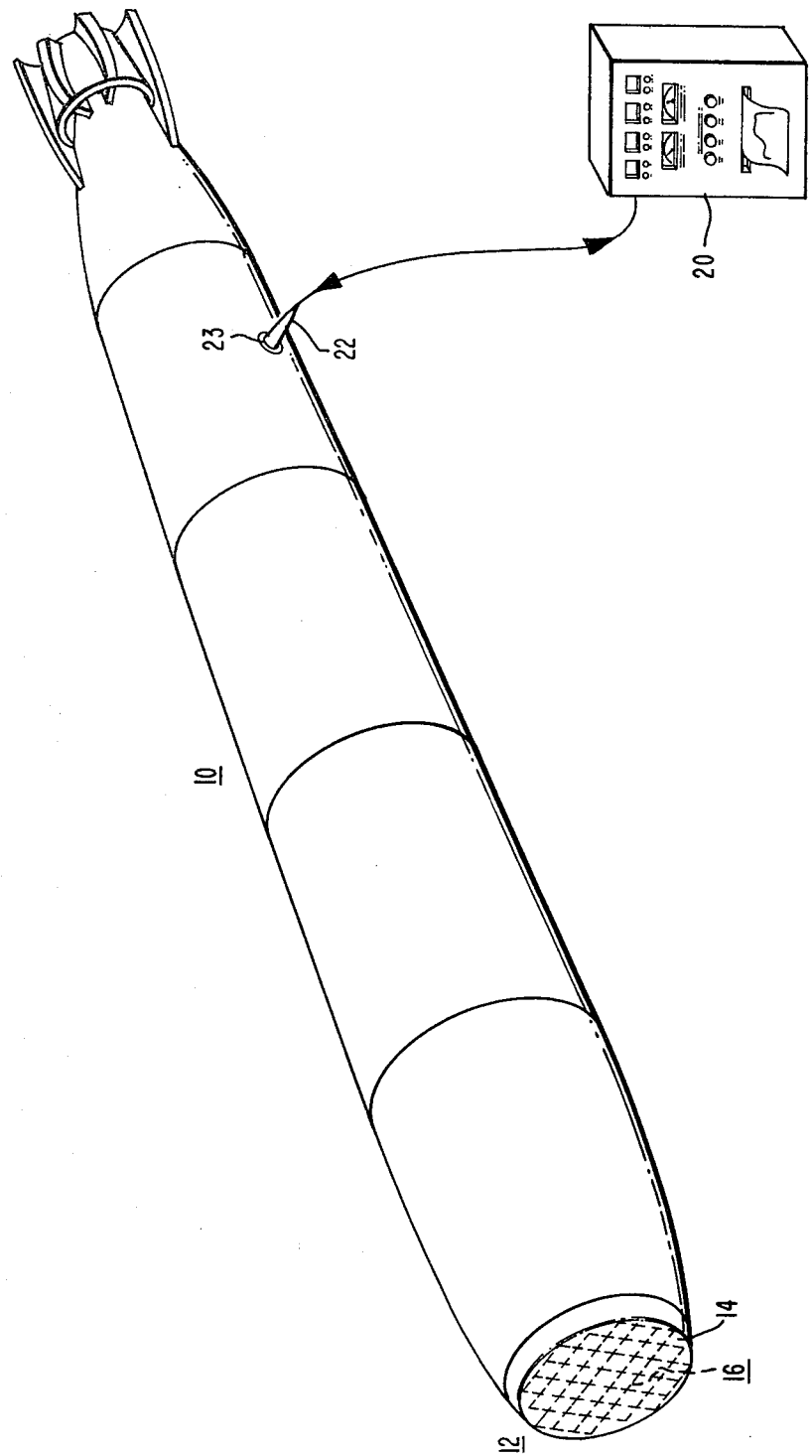
FIG. 1 illustrates a torpedo undergoing a prelaunch test.

Although the invention has applicability with respect to various transducer systems, it will be described by way of example, with respect to a torpedo of the homing variety such as is illustrated in FIG. 1.

Torpedo 10 includes a nose portion 12 at the forward end of which is an acoustic window 14, made of acoustically transparent material such as polyurethane. Acoustic sensing means in the form of a transducer array 16 is disposed behind and coupled to acoustic window 14 for receiving, from a target, signals either generated by the target itself or signals reflected from the target as a result of an acoustic transmission by the array 16.

A variety of torpedo types exist, and for example, some may be launched from submarine vessels, while others are launched from surface vessels and still others are launched from aircraft. For various tactical situations, it is desired to know, prior to launch, whether the sensing system and its associated signal processing circuitry is operating correctly. In the present invention, due to the novel transducer design utilized, this prelaunch checkout may be accomplished by simply connecting test equipment 20 with the transducers and signal processing circuitry through a plug and socket arrangement 22 and 23, the socket being disposed for example, on the shell of torpedo 10 and being connected to the various transducers and signal processing circuit points. For those types of torpedos which carry their own computer built-in test circuitry, equipment 20 may provide the necessary command signals to such built-in test circuitry and provide a read-out of the torpedo's condition.

Figure 2:
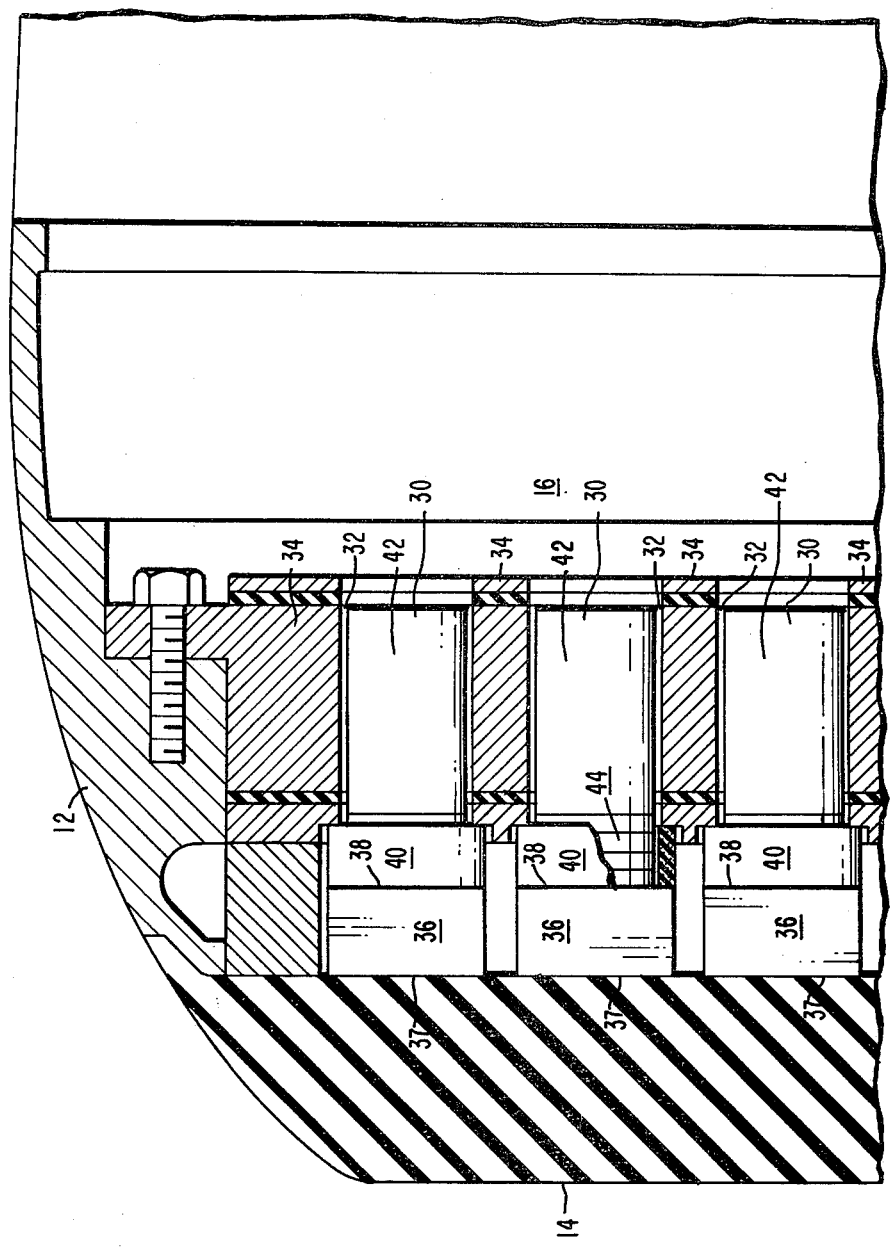
FIG. 2 is a cross-sectional view of a portion of the torpedo nose illustrating some transducers of an array.

FIG. 2 illustrates a part of the forward end of the torpedo with portions broken away. The transducer array 16 is made up of a plurality of individual transducers 30 each positioned within a respective hole 32 of a support web 34.

Transducer 30 is of the type which includes a head mass 36 having a front face 37 glued to the acoustic window 14 and has a rear face 38 which is supported from web member 34 by means of a support ring 40 (seen partially broken away in the middle transducer).

Each transducer additionally includes a tail mass 42 which is operative as an inertial element and further includes a first active transducer means 44 (best seen through the broken away portion of support ring of the middle transducer) interposed between, and coupled to, the head and tail masses. A cross-sectional view of a typical transducer is illustrated in FIG. 3 to which reference is now made.

Figure 3:
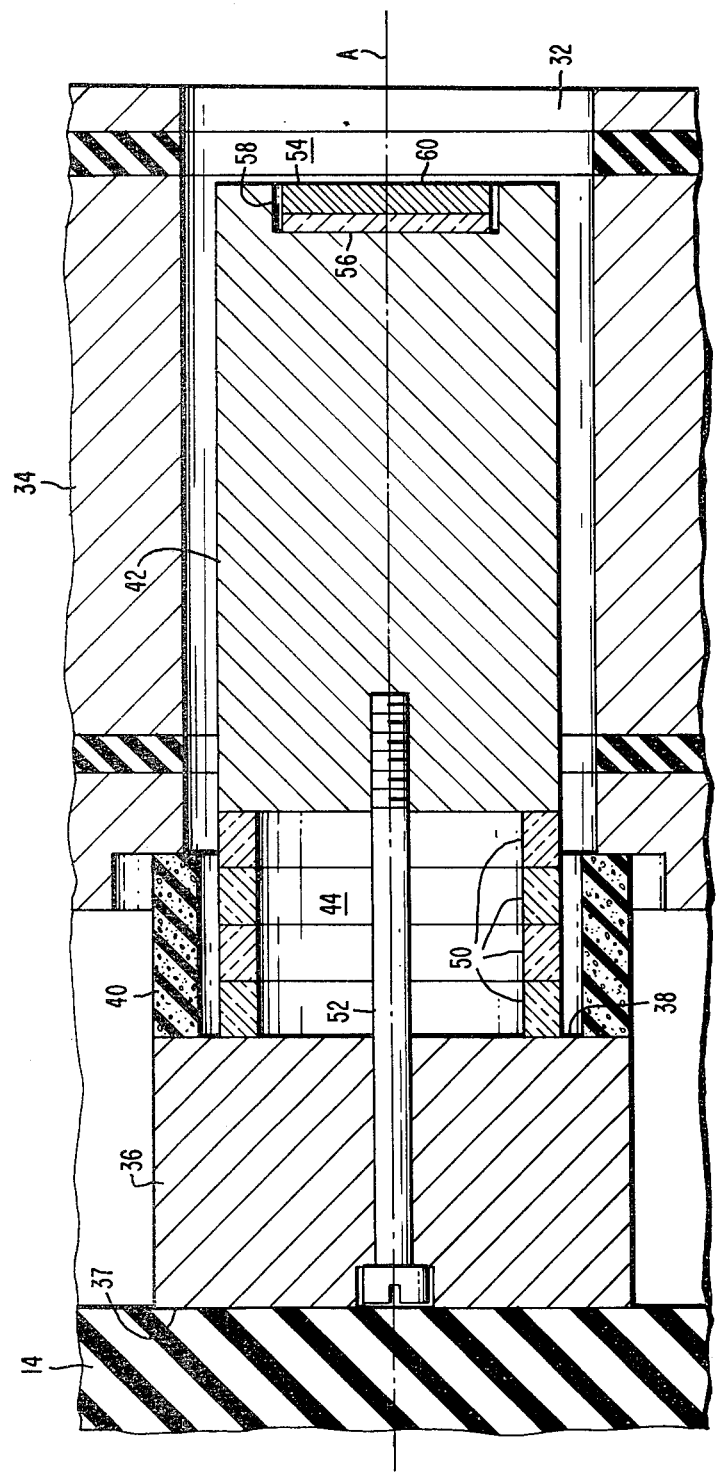
FIG. 3 is a cross-sectional view of one of the transducers illustrating an embodiment of the present invention.

As seen in FIG. 3, the first active transducer means 44 is made up of a stack of piezoceramic rings 50, for example lead-zirconate-titanate. Passing through the center of the stack and connecting the head mass 36 with the tail mass 42 is a stress bolt 52 threadedly engaged with tail mass 42 and being colinear with the central axis A of the transducer. Such construction of head mass, tail mass, and interposed stack of piezoelectric rings is a well-known transducer construction as is the support ring 40, which may be made of syntactic foam material with hollow microspheres, interposed between support web 34 and the rear face 38 of head mass 36.

In order to test each transducer of the array for proper operation prior to a launch, and without the requirement for an actual water test or inverse transducers, the present invention includes auxiliary active transducer means 54 coupled to tail mass 42. In the embodiment illustrated in FIG. 3 the auxiliary active transducer means includes a disc of piezoceramic material 56 positioned within a well 58 at the rear of tail mass 42 and having a central axis colinear with axis A. The piezoelectric disc 56 may be made relatively thin with the provision of a backing mass inertial element in the form of a disc 60.

Figure 3A:
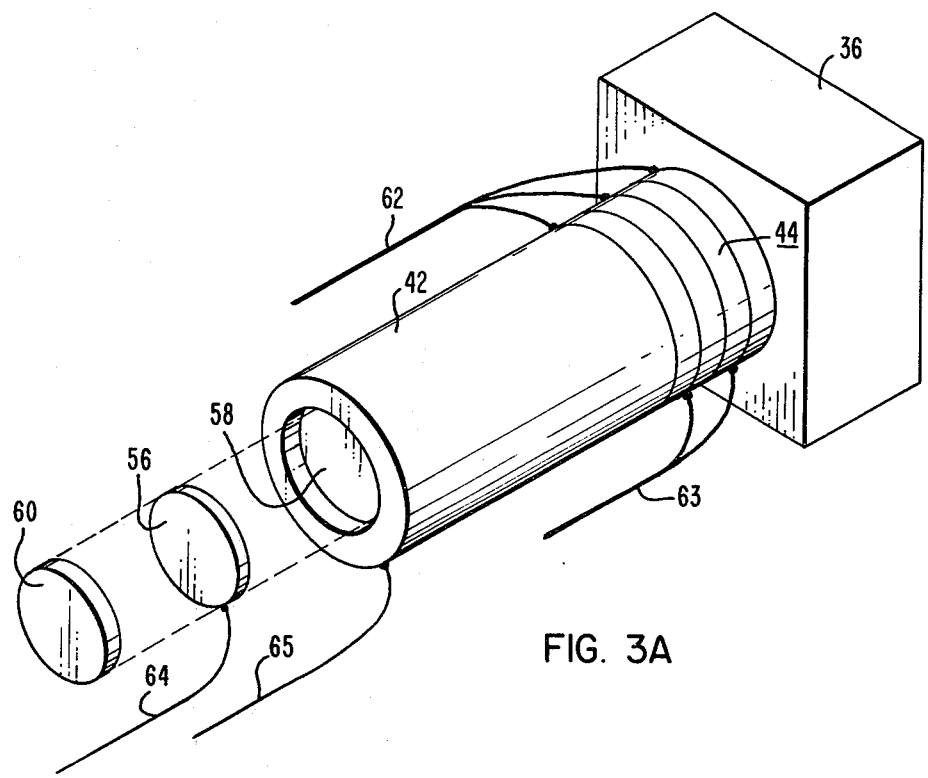
FIG. 3A is an exploded view of a rear portion of the transducer of FIG. 3.

For convenience, electrical leads have not been illustrated in FIG. 3 but are illustrated in FIG. 3A which shows the rear end of tail mass 42 and the auxiliary transducer means in exploded relationship. Electrical leads 62, 63 are connected to the main piezoelectric stack 44 of the transducer while leads 64 and 65 are for operation of the auxiliary transducer means 56. Head mass 36 may be made out of such material as aluminum, while the tail mass 42 may be made for example from stainless steel. As such, it may form a ground potential connection for both active transducer means 44 and 56 although of course other arrangements using insulating discs may be provided.

Application of an input signal to transducer means 54 will cause it to vibrate to such an extent so as to move the tail mass 42 thereby causing a corresponding output signal to be provided by transducer means 44 just as though it were produced by an acoustic wave impinging upon head mass 36 through the acoustic window 14. Thus, the response of an individual transducer of the array may be tested by examining the resultant signal produced by the stack of piezoceramic rings 50. Further, by providing the individual auxiliary transducers 54 of the transducers of the array with signals of predetermined different phases, the signal processing circuit normally provided with the transducers may be checked with respect to beam formation and beam steering. Conversely, to check the transducer and the array in a transmit mode of operation, a test signal may be applied to the stack 50 causing a resultant movement of tail mass 42 and a corresponding output signal from the auxiliary transducer 54 the output signal thereof being examined with respect to voltage levels, phases, etc. for checking individual transducer operation on transmit and the array for beam formation and steering.

Figure 4:
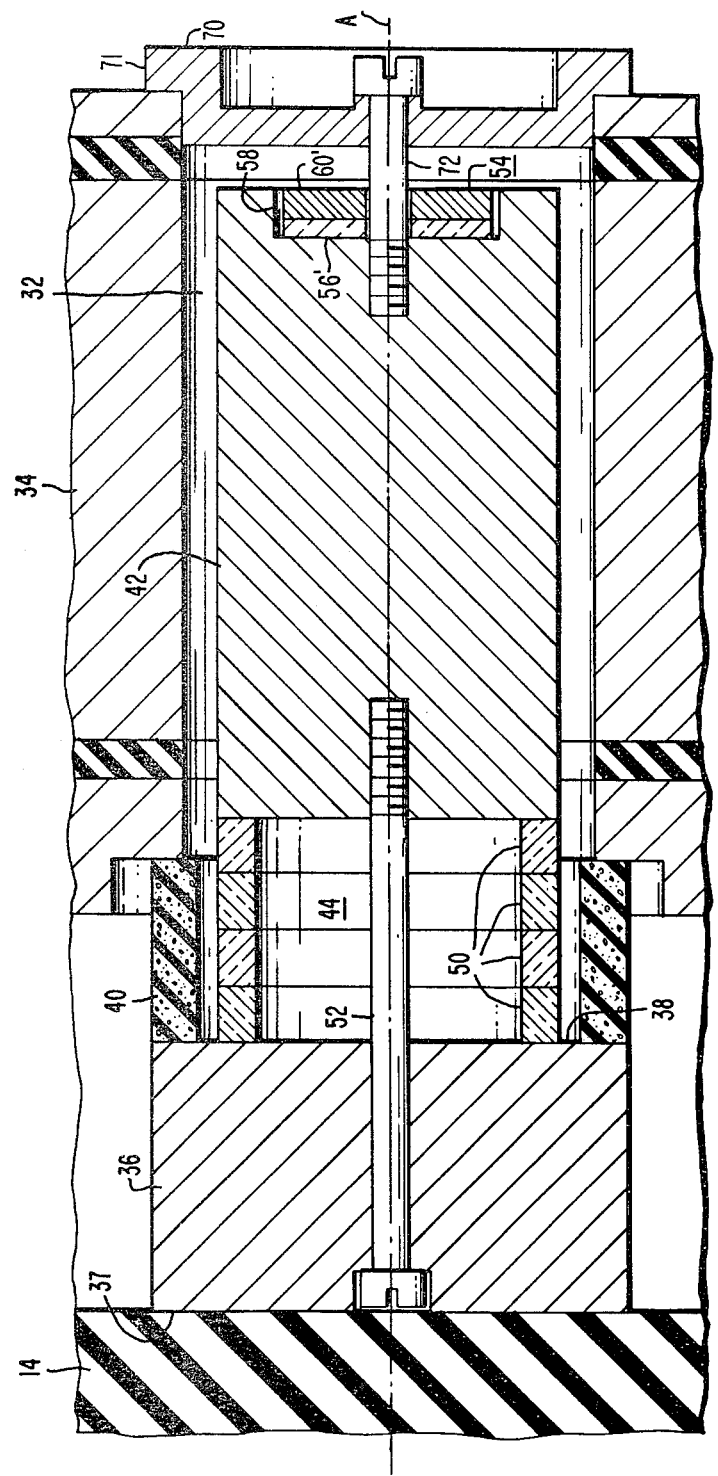
FIG. 4 is a view as in FIG. 3 illustrating a modified mounting arrangement.

FIG. 4 illustrates a variation of the arrangement of FIG. 3 and includes means for restraining lateral movement of the end of the tail mass 42. The arrangement includes a bracing member 70 having a flange portion 71 abutting the support web 34 and having a bolt 72 extending through a central aperture therethrough and being connected with the end of the tail mass 42. The auxiliary transducer 54 is modified to accommodate the bolt 72 such that the piezoelectric element and backing mass, given primed reference numerals, will each include a central aperture so as to be washer-like in construction.

Figure 5:
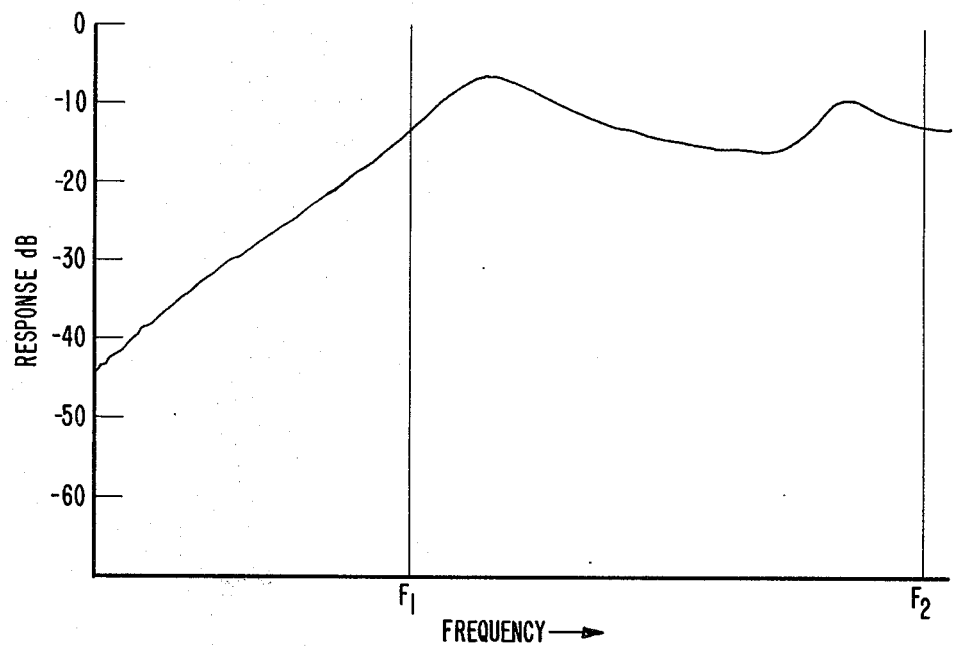
FIGS. 5 through 8 are curves illustrating the transducer response under various conditions.

FIG. 5 shows a curve of the actual response of a transducer assembly as described herein, bonded to a polyurethane acoustic window. The auxiliary transducer means of the transducer assembly was provided with a signal from a continuous wave swept frequency oscillator. In this regard it is desired that the transducer response be relatively flat within a certain bandwidth between frequencies $F_1$ and $F_2$ and that the response, that is the output voltage of the stack of piezoceramic rings be at a relatively high value. In order that the auxiliary transducer means not add any of its own resonance to the output signal, the resonant frequency thereof is made different than the remainder of the transducer assembly, and preferably ten times greater than the resonant frequency of the transducer assembly. It is operated however way below its natural resonant frequency and although operation as such may be relatively inefficient, it has sufficient drive to provide a meaningful output signal (as illustrated in FIG. 5) from the main stack.

In actual operation for an individual transducer check, the response values between the range $F_1$ and $F_2$ for a known good transducer assembly may be stored in a memory means of the test equipment (or a single minimum value within the range may be stored) and thereafter in a test just prior to launch, each individual transducer may be tested to provide a curve such as illustrated in FIG. 5 which will be compared with the previously stored values to give an indication of the then operability of the individual transducer.

Figure 6:
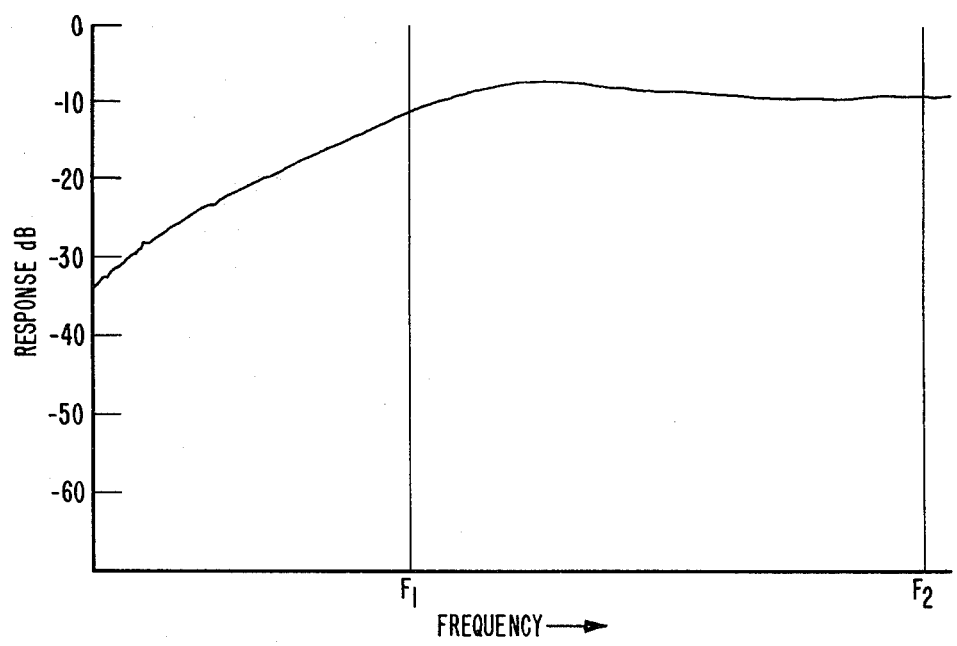
Figure 7:
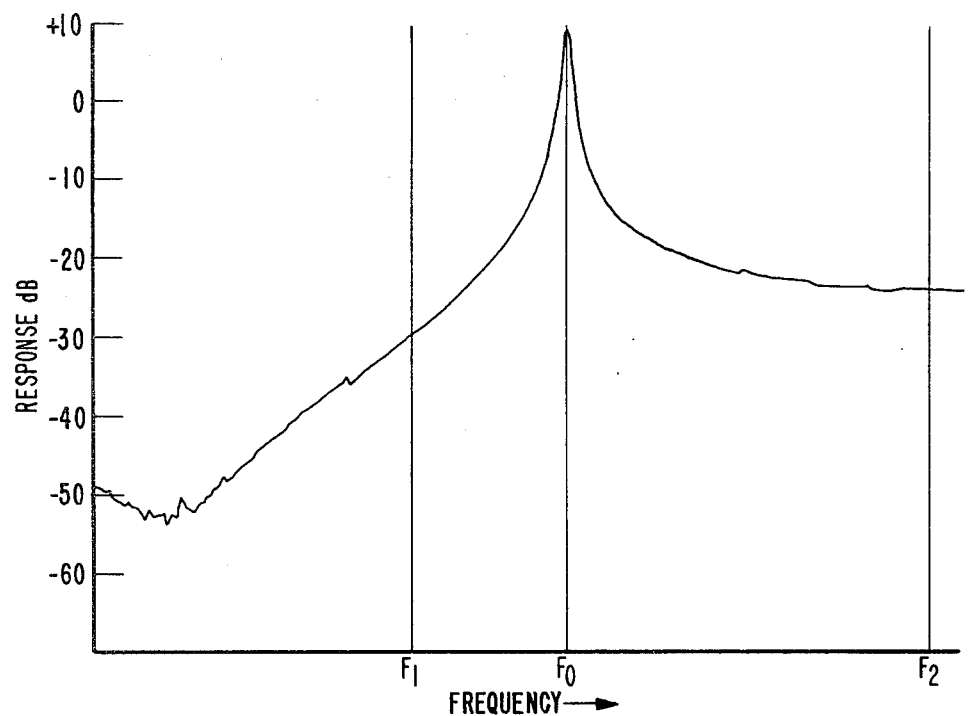

FIG. 5 may be compared with FIG. 6 which is a response curve of what the transducer assembly output would look like if it were coupled to the acoustic window and the acoustic window was in the water. The curve of FIG. 6 was an actual response obtained with a dummy load simulating the water, on the face of the acoustic window and it is seen that such a response is relatively flat and of a relatively high magnitude between the range $F_1$ and $F_2$. For test purposes, a response such as in FIG. 5 is relatively close to that shown in FIG. 6, as contrasted with a response illustrated in FIG. 7 which shows an objectionably high peak at the frequency $F_0$. The curve of FIG. 7 is an actual test curve of the transducer assembly taken with an air load, that is without being bonded to the acoustic window and would be for example the output at a prelaunch test if one of the transducer faces had become unglued from the transducer window.

Figure 8:
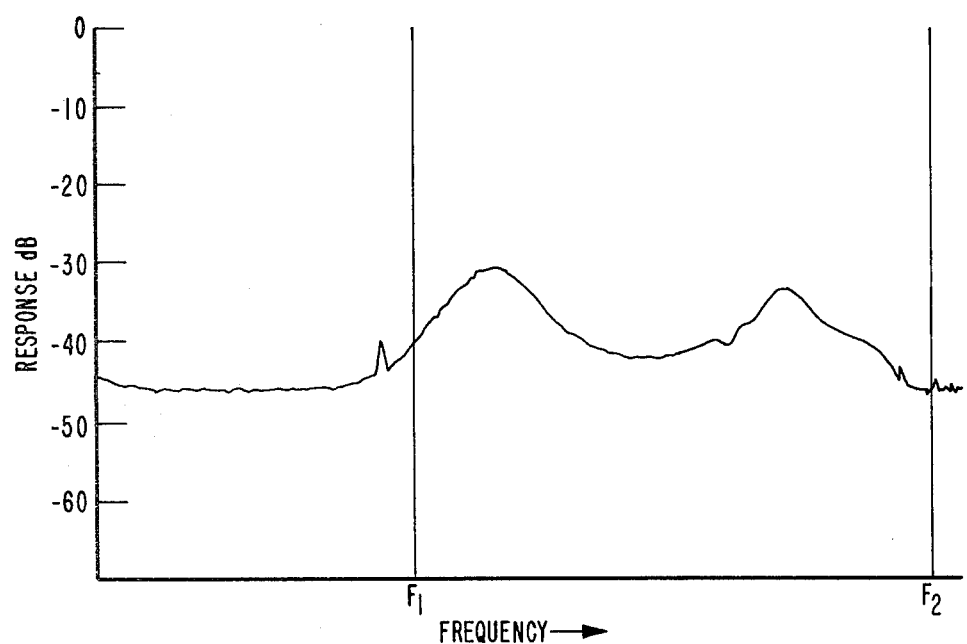

A further test on the apparatus was conducted utilizing two adjacent transducers coupled to an acoustic window, with the auxiliary transducer of one assembly being driven and the output of the main stack of the neighboring assembly being recorded. The results of the test are shown in FIG. 8 which illustrates that the signal is down at least 30 db in the range of interest and accordingly the effect on neighboring transducers, of driving the auxiliary transducers is insignificant.

Figure 9:
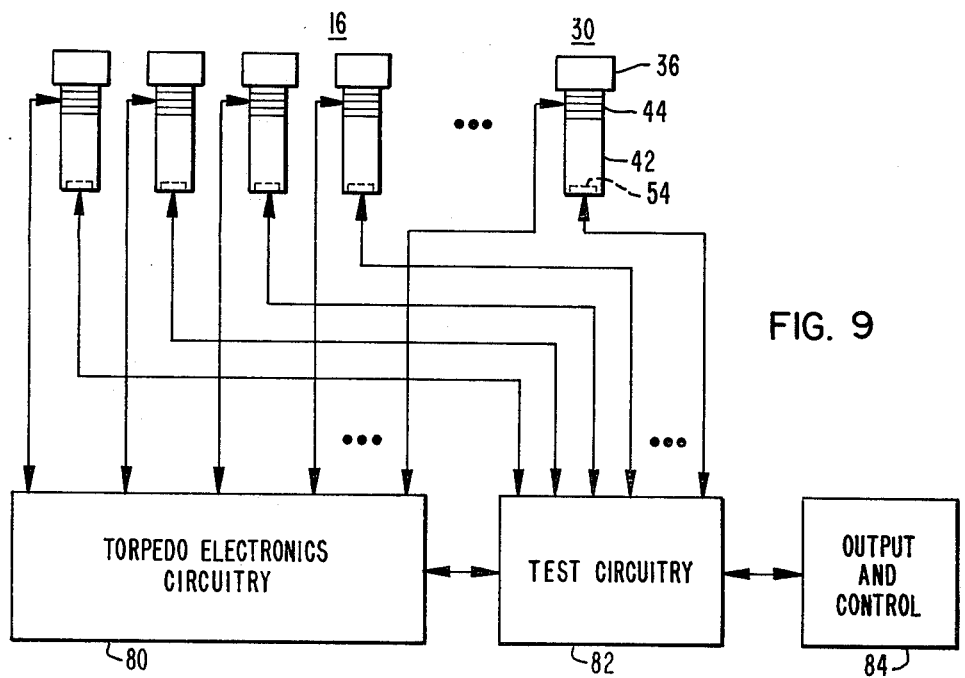
FIG. 9 is a block diagram illustrating a prelaunch checkout of the transducer array.

In FIG. 9 the torpedo's electronic circuitry 80 is shown in two way communication with the transducers of the array 16, and more particularly with the first active transducer means 44 thereof. During transmit, the circuitry 80 provides the transducer means 44 of the transducers with respective transmit signals, properly phased, and is operable in the receive mode of operation to combine the signals produced by the transducer means 44 to form one or more receiver beams which in some applications are steerable.

In order to ascertain that the beam signals are properly generated prior to launch, the electronic circuitry 80 is communicative with the test circuitry 82 operable to provide test signals to the respective auxiliary transducers 54 of the array and/or to receive therefrom signals provided by them when the transducers are in the transmit mode of operation. The results of the test circuitry is provided to output means 84 which is external to the torpedo and which may include various operator intiated control functions. Depending upon the torpedo, test circuitry 82 may be a built-in test circuit completely housed within the torpedo body, or alternatively may have some components that are within the body and others that are external to it.

Thus, there has been provided a transducer assembly which allows simultaneous element testing, beam forming testing, and other desired tests in a torpedo without the use of dummy water loads and without the requirement for inverse transducers, so as to be utilizable in a tactical situation where weight and space are at a premium. The assembly further allows for testing during the design and development phase of various transducer arrays and can be utilized for determining cavitation threshold levels for given depths and speeds of the torpedo.

We claim:

1. A transducer assembly for self-calibration comprising:
   (a) a head mass for projection and/or reception of acoustic energy;
   (b) a tail mass operative as an inertial element;
   (c) first active transducer means interposed between and coupled to said head and tail masses;
   (d) auxiliary active transducer means coupled to said tail mass and having a natural resonant frequency different from that of said coupled head mass, tail mass and first active transducer means;
   (e) said auxiliary transducer means being positioned so that when either one of said active transducer means is selectively supplied with an energizing signal, it will cause relative movement of said tail mass and a corresponding output signal from the other of said active transducer means;
   (f) means for electrically connecting said first active transducer means to transmit/receive signal processing circuitry; and
   (g) means for electrically connecting said auxiliary active transducer means to transducer testing circuitry.

2. Apparatus according to claim 1 wherein:
   (a) said tail mass is in the form of a cylinder having first and second ends;
   (b) said first end being coupled to said first active transducer means;
   (c) said second end being coupled to said auxiliary active transducer means.

3. Apparatus according to claim 2 wherein:
   (a) said second end has a recess therein;
   (b) said auxiliary active transducer means being within said recess.

4. Apparatus according to claim 2 wherein:
   (a) said auxiliary active transducer means is in the form of a disc.

5. Apparatus according to claim 4 wherein:
   (a) said first active transducer means has a central axis;
   (b) said disc has a central axis colinear with said central axis of said first auxiliary transducer means.

6. Apparatus according to claim 4 wherein:
   (a) said disc has a central aperture.

7. Apparatus according to claim 4 which includes:
   (a) a metallic disc positioned against one surface of said auxiliary active transducer means to act as a backing mass.

8. Apparatus according to claim 1 wherein:
   (a) the natural resonant frequency of said auxiliary active transducer means is at least approximately ten times that of said coupled head mass, tail mass and first active transducer means.

9. A transducer system comprising:
   (a) an array of transducer assemblies;
   (b) each said transducer assembly including;
      (i) a head mass for projection and/or reception of acoustic energy;
      (ii) a tail mass operative as an inertial element;
      (iii) first active transducer means interposed between and coupled to said head and tail masses;
      (iv) auxiliary active transducer means coupled to said tail mass and having a natural resonant frequency different from that of said coupled head mass, tail mass and first active transducer means;
      v) said auxiliary transducer means being positioned so that when either one of said active transducer means is selectively supplied with an energizing signal, it will cause relative movement of said tail mass and a corresponding output signal from the other of said active transducer means;
   (c) an acoustic window;
   (d) said head masses of said transducer assemblies of said array being coupled to said acoustic window;
   (e) means for electrically connecting all said first active transducer means to transmit/receive signal processing circuitry; and
   (f) means for electrically connecting all said auxiliary active transducer means to transducer testing circuitry.

10. Apparatus according to claim 9 wherein
   (a) said acoustic window is the forward part of the nose of a torpedo.

* * * * *